United States Patent
Lee et al.

(10) Patent No.: US 12,244,512 B2
(45) Date of Patent: *Mar. 4, 2025

(54) RESERVATION-BASED RESOURCE CONFIGURATION FOR WORKSPACES

(71) Applicant: Zoom Communications, Inc., San Jose, CA (US)

(72) Inventors: Cynthia Eshiuan Lee, Austin, TX (US); Harold David Moseley, Scarsdale, NY (US); Jeffrey William Smith, Layton, UT (US)

(73) Assignee: Zoom Communications, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/397,495

(22) Filed: Dec. 27, 2023

(65) Prior Publication Data

US 2024/0137328 A1    Apr. 25, 2024

Related U.S. Application Data

(63) Continuation of application No. 17/444,046, filed on Jul. 29, 2021, now Pat. No. 11,909,662.

(51) Int. Cl.
*H04L 12/24* (2006.01)
*H04L 12/911* (2013.01)
(Continued)

(52) U.S. Cl.
CPC ........ *H04L 47/722* (2013.01); *H04L 41/0816* (2013.01); *H04L 47/762* (2013.01); *H04L 47/781* (2013.01); *H04L 47/808* (2013.01)

(58) Field of Classification Search
CPC ..... H04L 41/04; H04L 41/08; H04L 41/0816; H04L 41/0853; H04L 47/72;
(Continued)

(56) References Cited

U.S. PATENT DOCUMENTS

| 7,054,938 B2 | 5/2006 | Sundqvist et al. |
| 7,233,933 B2 | 6/2007 | Horvitz et al. |

(Continued)

FOREIGN PATENT DOCUMENTS

| WO | 2015017664 A2 | 2/2015 |
| WO | 2018236862 A1 | 12/2018 |

OTHER PUBLICATIONS

International Search Report and Written Opinion mailed on Oct. 18, 2022 in corresponding PCT Application No. PCT/US2022/038490.
(Continued)

*Primary Examiner* — Alpus Hsu
(74) *Attorney, Agent, or Firm* — Young Basile Hanlon & MacFarlane, P.C.

(57) ABSTRACT

Reservations of resources within a dynamic workspace are made and facilitated including by pushing configurations specific to a worker for whom a reservation is made to the resource for a limited time period for the reservation. When the worker arrives for the reservation and checks in, configurations associated with the worker are obtained and pushed to the resource to configure the resource for use by the worker for a time period of the reservation. In some cases, an identity of the worker may be verified to complete the check in process for the reservation. In response to an end time of the reservation being determined, such as based on a scheduled end time for the reservation or based on a determination that the resource has gone unused for some amount of time, the configurations are removed from the resource to prepare the resource for use by a next worker.

20 Claims, 11 Drawing Sheets

(51) Int. Cl.
*H04L 12/923* (2013.01)
*H04L 12/925* (2013.01)
*H04L 12/927* (2013.01)
*H04L 41/0816* (2022.01)
*H04L 47/722* (2022.01)
*H04L 47/762* (2022.01)
*H04L 47/78* (2022.01)
*H04L 47/80* (2022.01)

(58) Field of Classification Search
CPC ..... H04L 47/722; H04L 47/76; H04L 47/762; H04L 47/781; H04L 47/788; H04L 47/808; H04L 47/821; H04L 47/826; H04L 47/827
See application file for complete search history.

(56) References Cited

U.S. PATENT DOCUMENTS

| | | | |
|---|---|---|---|
| 7,289,619 | B2 | 10/2007 | Vivadelli et al. |
| 8,644,473 | B1 | 2/2014 | Bardwell et al. |
| 8,718,619 | B2 | 5/2014 | Lidstrom et al. |
| 9,172,733 | B2 * | 10/2015 | Warrick ............. H04L 41/0893 |
| 9,300,925 | B1 | 3/2016 | Zhang |
| 9,495,465 | B2 | 11/2016 | Bowers et al. |
| 9,639,875 | B1 | 5/2017 | Elliott et al. |
| 9,697,046 | B2 | 7/2017 | Moroski et al. |
| 9,734,511 | B2 * | 8/2017 | Wood ................. G06Q 30/0206 |
| 9,781,176 | B2 | 10/2017 | Xin et al. |
| 10,062,045 | B2 | 8/2018 | Brown |
| 10,075,387 | B1 | 9/2018 | Avasol |
| 10,083,490 | B2 | 9/2018 | Williams, II et al. |
| 10,091,329 | B2 | 10/2018 | Kuo et al. |
| 10,181,139 | B2 | 1/2019 | Glass et al. |
| 10,289,966 | B2 | 5/2019 | Daher et al. |
| 10,296,851 | B2 | 5/2019 | Klein et al. |
| 10,477,396 | B2 | 11/2019 | Schultz et al. |
| 10,554,725 | B2 | 2/2020 | Kumar |
| 10,600,013 | B2 | 3/2020 | Koppel et al. |
| 10,686,851 | B2 * | 6/2020 | Warrick ............ H04N 21/43615 |
| 10,860,954 | B1 | 12/2020 | Yeluguri et al. |
| 10,882,185 | B2 | 1/2021 | Vu et al. |
| 10,911,499 | B2 * | 2/2021 | Warrick ................ H04L 65/612 |
| 10,998,970 | B1 | 5/2021 | Passe |
| 11,004,161 | B2 * | 5/2021 | Nishida .................. G06Q 50/12 |
| 11,583,457 | B2 | 2/2023 | Burton et al. |
| 2002/0188489 | A1 | 12/2002 | Cheng et al. |
| 2004/0003042 | A1 | 1/2004 | Horvitz et al. |
| 2005/0193023 | A1 | 9/2005 | Ismail |
| 2006/0224427 | A1 | 10/2006 | Salmon |
| 2008/0059254 | A1 | 3/2008 | Vivadelli et al. |
| 2012/0054355 | A1 | 3/2012 | Arrasvuori et al. |
| 2013/0311925 | A1 | 11/2013 | Denker et al. |
| 2014/0278594 | A1 | 9/2014 | Vivadelli et al. |
| 2015/0039357 | A1 | 2/2015 | Segal et al. |
| 2015/0112738 | A1 | 4/2015 | Marinaro et al. |
| 2016/0267402 | A1 | 9/2016 | Szabo |
| 2016/0300160 | A1 | 10/2016 | Klein et al. |
| 2017/0255880 | A1 | 9/2017 | Daher et al. |
| 2017/0286853 | A1 | 10/2017 | Liensberger et al. |
| 2017/0316383 | A1 | 11/2017 | Naganathan et al. |
| 2017/0331770 | A1 | 11/2017 | Griffin et al. |
| 2017/0357917 | A1 | 12/2017 | Holmes et al. |
| 2018/0267594 | A1 | 9/2018 | Meier et al. |
| 2018/0285777 | A1 | 10/2018 | Li et al. |
| 2018/0308029 | A1 | 10/2018 | Löffler et al. |
| 2019/0012614 | A1 | 1/2019 | Yamada et al. |
| 2019/0213465 | A1 | 7/2019 | Avrahami et al. |
| 2019/0228348 | A1 | 7/2019 | O'Keefe-Sally et al. |
| 2019/0228350 | A1 | 7/2019 | Klein et al. |
| 2019/0260590 | A1 | 8/2019 | Kuenzi |
| 2019/0306267 | A1 | 10/2019 | Lee et al. |
| 2019/0311303 | A1 * | 10/2019 | Kanteti .............. G06Q 10/1095 |
| 2020/0096346 | A1 | 3/2020 | Dhandapani et al. |
| 2020/0118045 | A1 | 4/2020 | Chung et al. |
| 2020/0174825 | A1 | 6/2020 | Hayashi |
| 2020/0218324 | A1 | 7/2020 | Decamp et al. |
| 2020/0302344 | A1 * | 9/2020 | Just ........................ G06F 21/34 |
| 2020/0305160 | A1 * | 9/2020 | Zeng ......................... H04L 1/00 |
| 2020/0311619 | A1 * | 10/2020 | Ramirez Flores ..... G06Q 10/02 |
| 2020/0311635 | A1 | 10/2020 | Emig et al. |
| 2020/0312120 | A1 * | 10/2020 | VanBlon ................ G08B 21/22 |
| 2020/0410407 | A1 | 12/2020 | Hashimoto |
| 2021/0065069 | A1 | 3/2021 | Yeluguri et al. |
| 2021/0150423 | A1 | 5/2021 | Tomosugi et al. |
| 2021/0233035 | A1 * | 7/2021 | Lee ..................... G06F 16/9537 |
| 2021/0350333 | A1 | 11/2021 | Hashimoto |
| 2021/0357878 | A1 | 11/2021 | Suzuki |
| 2021/0392550 | A1 | 12/2021 | Saito |
| 2022/0053036 | A1 | 2/2022 | Vashisht et al. |
| 2022/0239639 | A1 | 7/2022 | Jasleen et al. |
| 2022/0327438 | A1 | 10/2022 | Bach et al. |
| 2022/0350770 | A1 | 11/2022 | Bach et al. |
| 2023/0049989 | A1 | 2/2023 | Franc De Ferriere et al. |
| 2023/0050116 | A1 | 2/2023 | Franc De Ferriere et al. |
| 2023/0236632 | A1 | 7/2023 | Lukanc et al. |

OTHER PUBLICATIONS

International Search Report and Written Opinion mailed on Nov. 4, 2022 in corresponding PCT Application No. PCT/US2022/038493.
International Search Report and Written Opinion mailed on Jul. 31, 2023 in corresponding PCT Application No. PCT/US2023/019604.
International Search Report and Written Opinion mailed on Aug. 30, 2023 in corresponding PCT Application No. PCT/US2023/023544.
Sood T, Janssen P and Miller C; "Spacematch: Using Environmental Preferences to Match Occupants to Suitable Activity-Based Workspaces", 2020, Front. Built Environ. vol. 6:113 (Year: 2020).

* cited by examiner

RESERVATION-BASED RESOURCE CONFIGURATION FOR WORKSPACES

CROSS-REFERENCE TO RELATED APPLICATION(S)

This application is a continuation of U.S. patent application Ser. No. 17/444,046, filed Jul. 29, 2021, the entire disclosure of which is hereby incorporated by reference.

BACKGROUND

Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises systems, meaning that remote workers and those who are generally increasingly mobile may be unable to rely upon them. One type of system which addresses problems such as these includes a unified communications as a service (UCaaS) platform, which includes several communications services integrated over a network, such as the Internet, to deliver a complete communication experience regardless of physical location.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
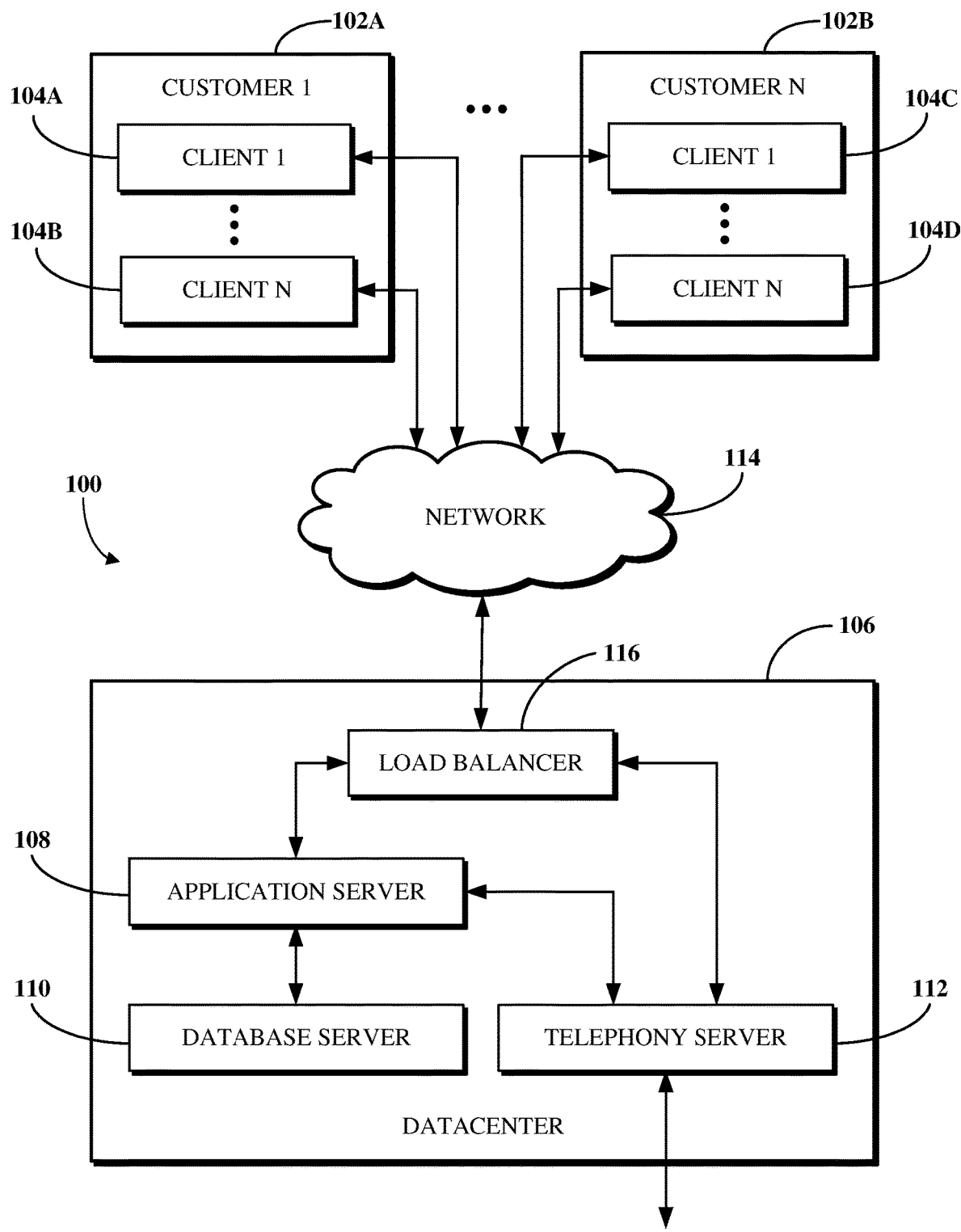
FIG. 1 is a block diagram of an example of an electronic computing and communications system.

Disclosed herein are, inter alia, implementations of systems and techniques for reservation-based resource configuration for dynamic workspaces.

One aspect of this disclosure is a method, which includes identifying a resource available for a reservation requested by a worker, responsive to the worker checking in for the reservation, pushing configurations defined for the worker to the resource, and responsive to an end of the reservation, removing the configurations from the resource.

Another aspect of this disclosure is an apparatus, which includes a memory and a processor configured to execute instructions stored in the memory to push configurations defined for a worker to a resource reserved by the worker at a first time responsive to the worker checking in for the reservation, determine an end of the reservation at a second time after the first time, and remove the configurations from the resource responsive to an end of the reservation.

Yet another aspect of this disclosure is a non-transitory computer readable medium storing instructions operable to cause one or more processors to perform operations, which include identifying a resource available for a reservation requested by a worker, pushing configurations defined for the worker to the resource responsive to verifying an identity of the worker when the worker checks in for the reservation, and removing the configurations from the resource responsive to an end of the reservation.

The ubiquity of connected devices and increased availability of high network throughput has enabled workers in a variety of industries to work remotely from physical office spaces. In some cases, workers may have the option to exclusively work remotely, such as from their homes or from separate workspaces. In other cases, workers may be given flexibility to work remotely some days and in a physical office space on others. As more workers move toward such hybrid work arrangements, fixed resource reservations, including but not limited to permanent desk assignments and nameplates, may be less frequently used. However, when such hybrid workers are present in a physical office space, they will still need reliable access to resources such as offices, computers, desktop phones, conference rooms, and the like. It is therefore important that office systems become dynamic workspaces which enable workers to reserve resources for use while present at the office.

In addition to the availability of resource reservations, it may be very useful for workers to know who else will be at the office when scheduling their time to come in and making their resource reservations. One of the main challenges in dynamic workspaces is the ability to help workers understand who is going to be physically present at the office at a given time. Some workers may not want to attend if their teammates or close work colleagues will not be there, and some may choose to leave if they arrive only to find out such people are not scheduled to be in that day. The uncertainty around who will be at the office thus in some cases leads to limited value in a worker wanting to be in the office. In many cases, beyond simply wanting to be in the office with certain other people, workers will seek to collaborate on projects either with other members of their direct teams or with colleagues on other teams. In such a case, a worker would benefit from understanding the future presence of those team members and colleagues. However, while conventional UCaaS platforms today have real-time user presence indicators to signal a status of a given user at a given time, they do not indicate future presence of users relative to in-office activity. Additionally, while conventional UCaaS platforms may in some cases have visibility into organization charts and the like to understand team structures, they do not have visibility into communication engagements to understand which workers outside of a team have deep engagements with one another.

Implementations of this disclosure address problems such as these using future presence signaling for dynamic workspaces, by which the future presence of a worker in a dynamic workspace which includes resources for temporary use may be indicated to other workers. In response a first worker making a reservation of a resource, a second worker is determined based on communication records associated with the first worker and the second worker. An indication of the reservation of the resource for the first worker, and thus the future presence of that first worker in an office which includes that reserved resource, is accordingly indicated to the second worker. A suggested resource for the second worker may then be determined based on the reservation of the resource for the first worker. In response to the second worker making a reservation of the suggested resource, a reservation record indicating the reservation of the suggested resource for the second worker may then be generated.

A further challenge in implementing dynamic workspaces relates to the process for reserving and using shared resources, which can in at least some cases be cumbersome. For example, it may be difficult for a worker to know when a resource such as an office or desk becomes available without a current user thereof checking out of the space first. That is, where an office or desk appears to be in use such as because ceiling lights or a computer are turned on when a worker awaiting that office walks by it, it will be unclear to that worker whether the office is now available for him or her to use. In another example, once a worker is in the office or desk, he or she must usually go through a process to manually port telephone extensions, software customizations, identity information, and other configurations to efficiently use the office or desk. This manual process for pushing worker-defined configurations is not only time consuming, but susceptible to various human error factors which may cause a resource to work improperly or not be usable during the time period allocated for the reservation. Thus, conventional approaches suffer from the lack of an automated process to push user configurations to reserved resources and to automatically track resource waitlists.

Implementations of this disclosure address problems such as these using reservation-based resource configurations for dynamic workspaces, by which a reservation of a resource may be made and facilitated within a dynamic workspace using configurations associated with a worker pushed to the resource for a limited time period for the reservation. A worker makes a reservation for a resource located within a dynamic workspace. When the worker arrives for the reservation and checks in, configurations associated with the worker are obtained and pushed to the resource to configure the resource for use by the worker for a time period of the reservation. In some cases, an identity of the worker may be verified to complete the check in process for the reservation. In response to an end time of the reservation being determined, such as based on a scheduled end time for the reservation or based on a determination that the resource has gone unused for some amount of time, the configurations are removed from the resource to prepare the resource for use by a next worker.

To describe some implementations in greater detail, reference is first made to examples of hardware and software structures used to implement a system for reservation-based resource configuration for dynamic workspaces. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client. In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
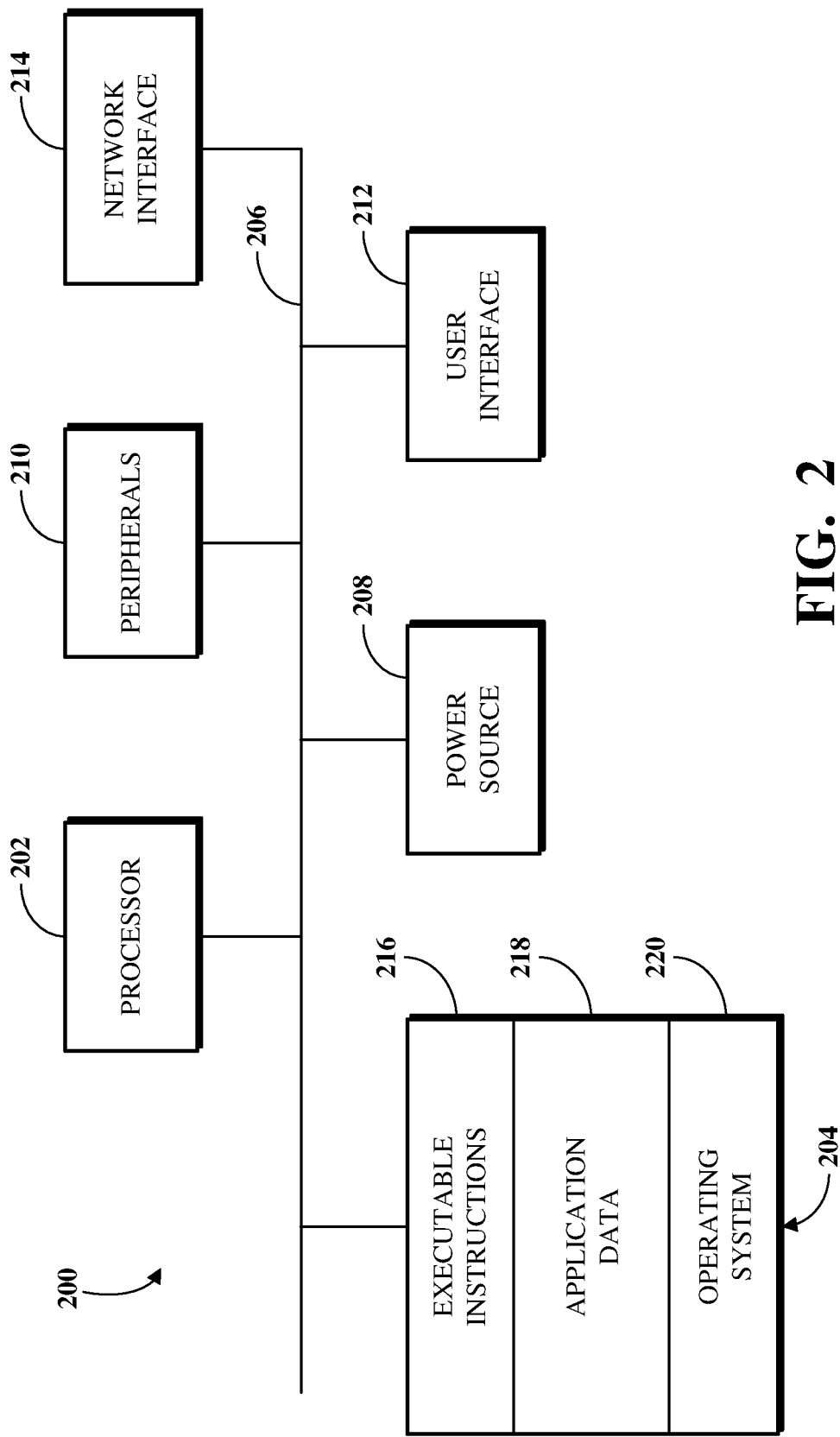
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
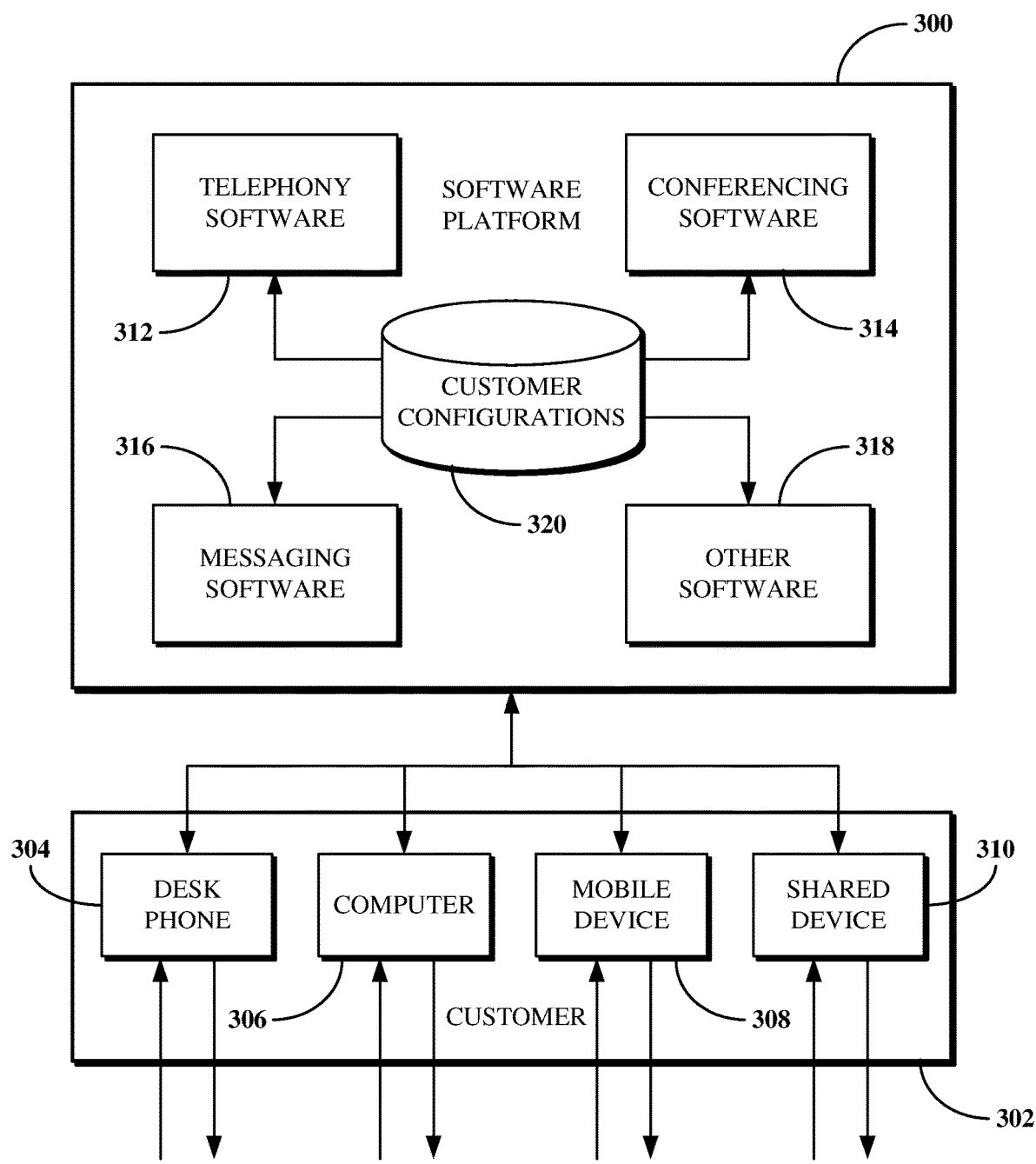
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include resource reservation software for processing reservations of resources for workers within a dynamic workspace including by pushing configurations for those workers to the reserved resources and for signaling the future presence of a worker within the dynamic workspace based on a reservation to another worker.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
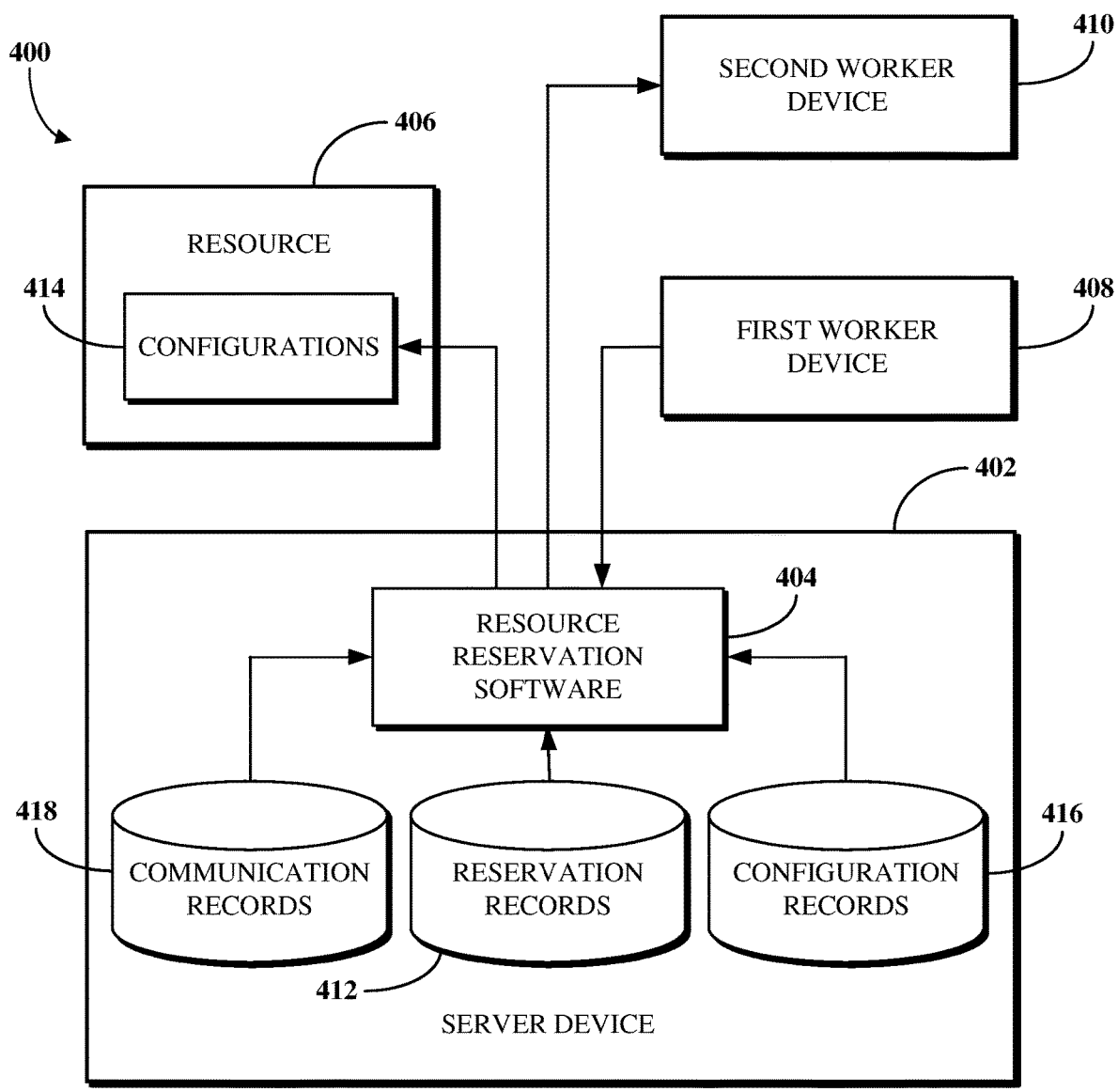
FIG. 4 is a block diagram of an example of a dynamic workspace resource reservation system.

FIG. 4 is a block diagram of an example of a dynamic workspace resource reservation system 400. The system 400 includes a server device 402, which may, for example, be a server device used to implement some or all of a software platform, for example, the software platform 300 shown in FIG. 3. In particular, the server device 402 runs resource reservation software 404 for facilitating reservations of resources, such as a resource 406, by workers within a dynamic workspace that includes those resources. For example, the dynamic workspace may refer to an office spanning one or more rooms of a suite, one or more suites on a floor of a building, one or more floors of a building, and/or one or more buildings. The resource reservation software 404 may, for example, be the resource reservation software described above with respect to the other software 318 shown in FIG. 3.

As shown, the resource reservation software 404 interacts with a first worker device 408 and a second worker device 410, although the resource reservation software 404 may interact with other numbers of devices. The first worker device 408 and the second worker device 410 may each be a client device, for example, one of the clients 304 through 310 shown in FIG. 3. In particular, the first worker device 408 and the second worker device 410 may each be mobile devices operated by different workers, such as a first worker who operates the first worker device 408 and a second worker who operates the second worker device 410.

The resource reservation software 404 operates principally to process reservations of resources for workers within the dynamic workspace and to signal the future presence of a worker within the dynamic workspace based on a reservation to another worker. Referring first to the processing of a reservation of a resource for a worker, the resource reservation software 404 may be used by a first worker associated with the first worker device 408 to make a reservation for the resource 406. For example, the first worker may use a client application running at the first worker device 408 to access and interact with the resource reservation software 404. In another example, the first worker may use a shared device associated with the dynamic workspace which includes the resource 406, such as a kiosk located in an office or building lobby, to access and interact with the resource reservation software 404. Once the reservation is made, the resource reservation software 404 generates a record of the reservation of the resource for the first worker and stores same in reservation records 412.

The resource reservation software 404 presents information indicating resources which are available for reservation to the first worker. The available resources may be presented to the first worker in a list format, a map format, or another format. The resource reservation software 404 identifies the available resources to present for potential reservation based on the reservation records 412 indicative of existing reservations for those and/or other resources. The first worker selects the resource he or she wants to reserve and completes the reservation process. The reservation may, based on timing availability of the resource and as selected by the first worker, begin immediately upon the first worker making the reservation or at a future time. The reservation may be for a default period of time or for a configurable period of time, subject to constraints as may be imposed on behalf of the dynamic workspace.

There may be a number of resources and types of resources which may be reserved using the resource reservation software 404. A non-exhaustive list of example types of resources which may be reserved using the resource reservation software 404 includes offices, conference rooms, cubicles, desks, computing devices, desktop telephones, digital signage displays, televisions, video systems, audio systems, Internet of Things (IoT) devices, The resource 406 may itself be a single resource or a resource which includes other resource. For example, the resource 406 may be an office which includes a computing device and a desktop telephone located within it and a digital signage display located outside of it (e.g., on or next to a door thereof). References to resources being associated with another resource may in at least some cases be understood to refer to that other resource including those associated resources, whether those associated resources are located within or outside of that other resource.

When the first worker arrives at the dynamic workspace for the reservation, the first worker checks in to begin the reservation. The first worker may check in before a period of time for the reservation begins or after it has already begun. The resource reservation software 404 checks in the first worker by verifying an identity of the first worker, such as to validate that he or she is the same person for whom the subject reservation was made. For example, the resource reservation software 404 may interact with the first worker device 408 to check in the first worker, such as based on a code (e.g., a QR code, bar code, or other scannable code aspect) scanned using the first worker device 408, a pairing or sharing key entered or selected at the first worker device 408, an ultrasonic frequency detected by the first worker device 408, or the like.

Responsive to the first worker checking in for the reservation, configurations 414 defined for the first worker are pushed to the resource 406. The configurations 414 include or otherwise refer to aspects specific to the first worker and which are pushed to the resource 406 to enable use of the resource 406 by the first worker. For example, the configurations 414 may include one or more of a telephone extension configured for pushing to a telephone device associated with the resource 406, a name configured to pushing to digital signage associated with the resource 406, background imagery configured for pushing to a client application running on a computing device associated with the resource 406, or the like. The configurations 414 may be obtained by the resource reservation software 404 from configuration records 416 at the server device 402 or another server device. Alternatively, the configurations 414 may be obtained by the resource reservation software 404 from the client application running at the first worker device 408. In either case, the configurations 414 are pushed to the resource without manual intervention by the first worker.

The first worker may then utilize the resource 406 as he or she desires until an end of the reservation of the resource 406. The end of the reservation of the resource 406 may be determined based on one or more of a defined end time for the reservation or the resource 406 going unused for a threshold period of time. For example, and by default, the resource reservation software 404 may reference the time period for which the resource 406 is reserved for the first worker to determine a defined end time representing the time at which that time period ends. In another example, the resource reservation software 404 may monitor the use of the resource 406 during the reservation period, such as using one or more sensors located within and/or otherwise nearby the resource 406, and end the reservation period before the defined end time where it is determined that the resource 406 has gone unused for a threshold period of time (e.g., one hour). In some cases, the threshold period of time may be configurable. In some cases, the resource reservation software 404 may transmit a notification to the first worker before ending the reservation period before the defined end time so as to provide the first worker with the opportunity to resume use of the resource 406. Regardless of when the end of the reservation of the resource 406 is determined, upon the end of the reservation of the resource 406, the resource reservation software 404 removes the configurations 414 from the resource 406 to enable use of the resource 406 by a next worker, whether or not a pending reservation for the resource 406 exists.

Referring next to the signaling of the future presence of a worker within the dynamic workspace based on a reservation to another worker, the resource reservation software 404 determines a future presence of a first worker, that is, a date and time at which the first worker will be physically present in the dynamic workspace, based on a date and time corresponding to a reservation of a resource for the first worker and then indicated that future presence to a second worker by notifying the second worker as to the reservation. In this way, the second worker may himself or herself make a reservation for a resource during the same period of time or an overlapping period of time as the reservation of the resource for the first worker. In particular, the signaling of the future presence of a given worker may enable greater opportunities for collaboration or in-person work based on automated determinations of engagements between workers by the resource reservation software 404.

Responsive to a reservation of the resource 406 for the first worker, the resource reservation software 404 may determine an engagement between the first worker and the second worker based on communication records 418. The communication records 418 are records of communications involving at least one of the first worker or the second worker and in many cases may be records of communications between the first worker and the second worker. The communications associated with the communication records 418 may, for example, be conference transcripts, call transcripts, chat messages, text messages, email messages, or the like. As such, the communication records 418 may include content from one or more of a conference transcript, a call transcript, a chat message, a text message, an email, or the like. The resource reservation software 404 may in some cases determine the engagement between the first worker and the second worker based on output of a learning model trained based on conversational dynamics. For example, the learning model may analyze the communication records 418 based on one or more of a subject matter of a dialogue represented by the communication records 418 or a length of the dialogue.

The resource reservation software 404 then transmits an indication of the reservation of the resource for the first worker to the second worker. For example, the resource reservation software 404 may transmit a notification indicating a future presence of the first worker to the second worker device 410 or another device associated with the second worker. The indication of the reservation is to notify the second worker that the first worker will be present in the dynamic workspace at a date and time corresponding to the reservation of the resource 406 for the first worker. Thus, the notification transmitted to the second worker device 410 may indicate that date and time. The notification transmitted to the second worker device 410 may, for example, be a calendar alert which may be processed using calendar software.

In some cases, the second worker may access the resource reservation software 404 to make his or her own reservation for a resource during the same or an overlapping time as for the reservation of the resource 406 for the first worker, for example, by the second worker using a client application running at the second worker device 410, a shared device within an office lobby or other physical space, or the like.

However, in some cases, the resource reservation software 404 may determine a suggested resource for the second worker to reserve based on the reservation of the resource 406 for the first worker. In particular, the suggested resource may be of a same or similar resource type as the resource 406 reserved for the first worker and may be located nearby the resource 406 to allow the first worker and the second worker to work nearby one another. For example, where the resource 406 is a first desk or office, the suggested resource may be a second desk or office located within a threshold range of the resource 406. The threshold range represents a physical or spatial distance between resources and may have a default or configurable value. For example, where the threshold range represents a physical distance, the value thereof can be measured in terms of feet, yards, or meters between the respective resources. In another example, where the threshold range represents a spatial distance, the value thereof can be measured in terms of a number of desks, offices, floors, or the like between the respective resources. The resource reservation software 404 may, for example, identify resources within a threshold range of the resource 406 to determine the suggested resource for the second worker. Where the second worker proceeds to make a reservation, either for a resource he or she selected or for a suggested resource determined by the resource reservation software 404, the resource reservation software 404 generates a record of the reservation of the resource for the second worker and stores same in the reservation records 412.

Although a reservation of a single resource (which in some cases may include multiple resources) is described above, in some implementations, a worker may make a reservation for multiple separate resources for the same period of time, overlapping periods of time, or different periods of time. For example, a worker may reserve a first resource as a desk which itself includes a desk phone and a computing device as well as a second resource as a conference room. Where multiple separate resource reservations are made, the future presence of that worker may be signaled to another worker based on one or more of those reservations. Where those multiple separate resource reservations overlap, some or all of the configurations for the worker may be simultaneously pushed to all of the reserved resources.

Figure 5:
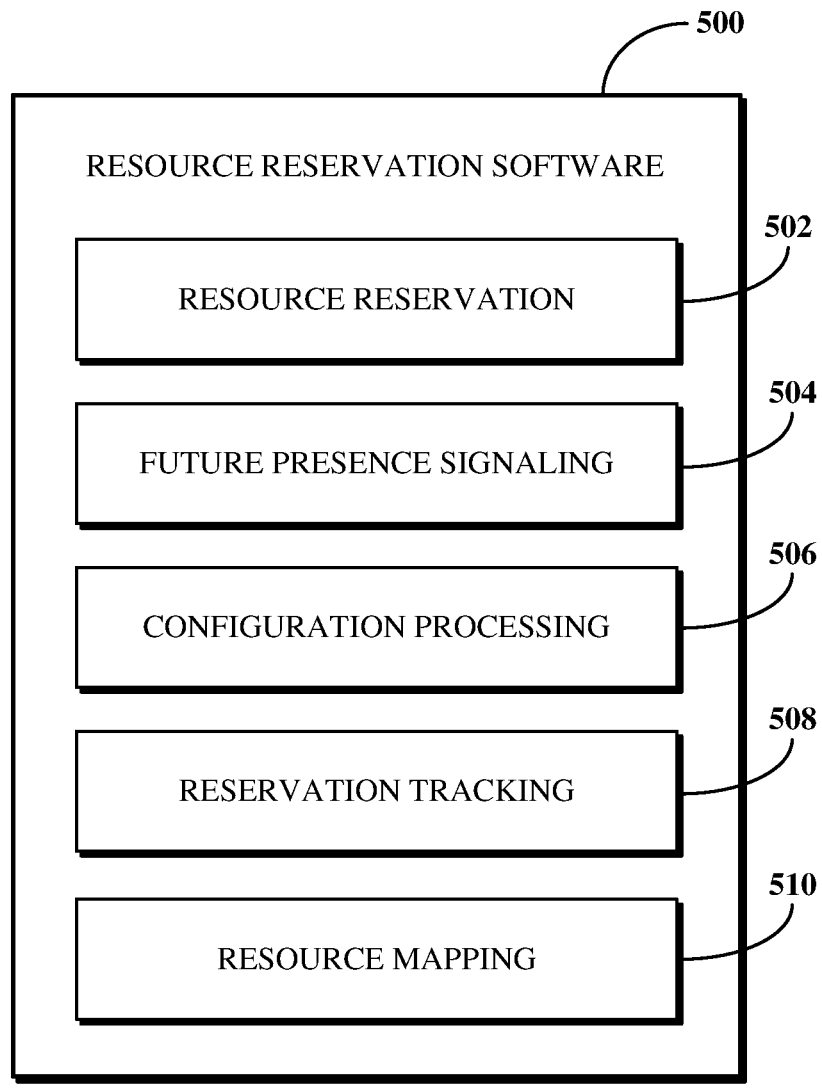
FIG. 5 is a block diagram of example functionality of resource reservation software.

FIG. 5 is a block diagram of example functionality of resource reservation software 500, which may, for example, be the resource reservation software 404 shown in FIG. 4. The resource reservation software 500 includes tools, such as programs, subprograms, functions, routines, subroutines, operations, and/or the like for processing reservations of resources for workers within a dynamic workspace, signaling the future presence of a worker within the dynamic workspace based on a reservation to another worker, and the like. As shown, the resource reservation software 500 includes a resource reservation tool 502, a future presence signaling tool 504, a configuration processing tool 506, a reservation tracking tool 508, and a resource mapping tool 510.

The resource reservation tool 502 makes reservations of resources for workers. The resource reservation tool 502 receives requests for reservations from worker devices, such as mobile devices running client applications or other devices configured to access a web portal associated with the resource reservation software 500, and/or shared devices usable by workers. The resource reservation tool 502 maintains a list of resources which are available at certain dates and times based on existing reservations of resources. For example, the resource reservation tool 502 may use a calendaring system to maintain a list of resources which are available at certain dates and times, such as based on reservations populated within that calendaring system. In some implementations, the calendaring system may include calendar software implemented by a software platform, for example, the software platform 300 shown in FIG. 3.

The resource reservation tool 502 may present output within a user interface (e.g., of a client application, a web portal, or another aspect used to access the resource reservation software 500) to visually represent resources which are available for reservation at certain dates and times. For example, the resource reservation tool 502 may present as output a two-dimensional or three-dimensional map of an office premises including the resources. The map of the office premises may indicate locations of respective resources, dimensions of respective resources to scale, or both. The resource reservation tool 502 may visually mark those resources within the two-dimensional or three-dimensional map which are available to distinguish them from those resources for which reservations at the subject dates and times exist. For example, the resource reservation tool 502 may color or shade objects representative of available resources in green and objects representative of reserved resources in red.

In some cases, the ability to make a reservation may be subject to one or more blocking rules. A blocking rule is or refers to a definition or other configuration for limiting certain resource reservations for a worker based on an existing resource reservation for another worker being within a threshold range. In particular, a blocking rule may limit the list of available resources presented to a worker using the resource reservation tool 502 based on information associated with the worker. The information may derive from one or more of organization chart, worker profile, human resources, directory, and/or like records.

A blocking rule may be policy-based or productivity-based. Policy-based blocking rules limit the ability of two workers to reserve resources within a threshold range of one another due to their being on different teams which are restricted from one another. For example, where the dynamic workspace is used by workers in the financial field in which a policy restricts interactions between traders and bankers, a policy-based blocking rule may prevent a trader from reserving a resource within a threshold range of a resource already reserved by a banker, or vice versa. Productivity-based blocking rules limit the ability of two workers to reserve resources within a threshold range of one another due to a determination that those workers are disruptive to others or otherwise inefficient when seated nearby one another. For example, a productivity-based blocking rule may prevent a worker who has been observed on one or more occasions to have prolonged personal discussions with another worker from reserving a resource within a threshold range of a resource already reserved by that other worker.

The blocking rules may be generated using an intelligence aspect which accesses organization chart, worker profile, human resources, directory, and/or like records. Alternatively, the blocking rules may be manually entered by a user of the resource reservation software 500. The threshold range may be configurable. In some implementations, the threshold range may have a default value based on a nature of the block rule. For example, the threshold range used for policy-based blocking rules may by default be different from the threshold range used for productivity-based blocking rules.

The resource reservation tool 502 also processes requests for workers to check in for reservations by verifying identities of those workers. When a worker checks in for a reservation of a resource, the worker may use his or her device to scan a code to link the reservation to a client application running on the device. In response thereto, the device of the worker may be prompted by the resource reservation tool 502, with or without notice to the worker, for information usable to identify the worker. The information is then transmitted to the resource reservation tool 502 for identity verification, such as to complete the check in process.

The future presence signaling tool 504 determines a worker to whom to transmit an indication of a reservation by another worker responsive to that other worker making the reservation. The future presence signaling tool 504 uses the output of a learning model trained based on contextual dynamics to determine engagements between workers by analyzing communication records associated with those workers. In particular, the future presence signaling tool 504 transmits a notification indicating that a given worker has made a reservation for a given date and time to another worker determined to have an engagement with that given worker to enable that other worker to himself or herself make a reservation for the same time or an overlapping time on the same date.

The learning model which produces the output used by the future presence signaling tool 504 analyzes past communications such as meeting content, chat content, email content, and the like to determine other workers with whom a given worker frequently engages. The learning model generally seeks to understand who the main colleagues of a given worker are, regardless of whether they are on a same work team. If a worker sends an email or chat message out, the system will track the recipients and look deeply at the subject matter of the dialogue and the length of the dialogue between recipients to understand who actively participated in the dialogue and to what degree.

For example, the learning model may analyze a group email chain with ten recipients to determine that only two actively engaged in a dialogue, and thus that those two email recipients may be more closely engaged with one another than either of them and the eight silent email recipients. In some cases, the learning model may also leverage project workflows, calendars, Active Directory data, organization charts, and the like to determine those who have relevant engagements and should thus be notified of each other's future presence.

The future presence signaling tool 504 may further determine a suggested resource for a worker to whom the future presence of another worker was signaled. The reservation resource software 500 keeps track of locations of reserved and available resources and the workers who have reserved those resources. The future presence signaling tool 504 is able to suggest certain available resources based on engagements determined using the intelligence tool. In this way, a group of close workers can be seated nearby one another.

The configuration processing tool 506 pushes configurations associated with a worker for whom a resource is reserved to that resource in response to the worker checking in for the reservation. The configuration processing tool 506 can obtain information associated with the configurations from a device of the worker, such as from a client application running thereon, from a data store which stores configurations for one or more workers, or from another source. The configuration processing tool 506 may receive an indication of when a worker checks in for a reservation and obtain the subject configurations in response thereto. The particular configurations obtained are based on the type of resource reserved. For example, where the reserved resource is an office which includes a desk phone, a computing device, and digital signage, the configurations may correspond to a telephone extension to be pushed to the desk phone, background imagery to be pushed to a client application running on the computing device, and a name to be pushed to the digital signage. The configuration processing tool 506 later receives an indication that the reservation of the resource for the worker has ended and accordingly removes the configurations from the resource. The removal of the configurations for one worker enables the pushing of configurations for a next worker for whom the subject resource is next reserved.

The reservation tracking tool 508 tracks active reservations. In particular, the reservation tracking tool 508 monitors active reservations to determine times at which those reservations end. The end time for a reservation of a resource may be defined by an administrator or other agent of the dynamic workspace. In some cases, default time periods for resource reservations may be used based on the types of those resources. For example, resources which are commonly used by a single person without frequent turnover such as offices or desks may be given twelve hour reservation periods. In another example, resources which are used by multiple people in shorter periods such as conference rooms may be given one hour reservation periods. However, the reservation tracking tool 508 may determine an end time of a reservation before that time period associated with the reservation elapses. In particular, where monitoring data, such as which may be received from one or more sensors coupled to or otherwise located nearby a reserved resource, indicates that the resource has gone unused for a threshold amount of time, the reservation tracking tool 508 may determine that the reservation has ended.

The reservation tracking tool 508 may maintain waitlists for various resources. Workers who seek to make reservations for certain resources which are already reserved may be allowed to join a waitlist for that resource. For example, a reserved resource may in some cases go unused where the worker for whom the reservation was made does not utilize the resource. In such a case, a waitlist for resources in high demand allows workers to get in and thus increases utilization of those resources. The reservation tracking tool 508 may use rules defining when a given reservation may be ended, such as based on a threshold period of time elapsing without the resource being utilized. Upon that threshold period of time being met, the reservation tracking tool 508 may automatically end the subject reservation and then transmit a message to the next person waiting for that resource to indicate that he or she has the opportunity to check in for a reservation of that resource. In some cases, upon that threshold period of time being met, the reservation tracking tool 508 may transmit a notification to the worker who currently holds the reservation over the subject resource informing him or her that the reservation will be ended in some amount of time (e.g., ten minutes) if resource utilization is not detected before then.

The reservation tracking tool 508 may receive data generated from one or more sensors located within or nearby the resource to determine whether the resource has gone unutilized for the threshold period of time. For example, the sensors may include motion sensors within offices or conference rooms or focused on desks. In another example, the sensors may include power meters for measuring electrical usage of devices. In yet another example, the sensors may include pressure sensors or other sensors for detecting when a resource has been used. In still a further example, the sensors may include cameras having fields of view which include the resource, in which an object detection software intelligence aspect can process video feeds output by those cameras to determine whether a human is also in those fields of view.

The resource mapping tool 510 maintains a map of workers utilizing active resources at a given time. For example, the resource mapping tool 510 may indicate locations of those workers within a map of the dynamic workspace, such as in connection with resources reserved for those workers. The map of the dynamic workspace may, for example, be the map which is presented at client applications, kiosks, and the like to workers who are seeking to make reservations for available resources. Thus, the resource mapping tool 510 may enable workers to make informed decisions about resources to reserve. The resource mapping tool 510 updates the map of workers based on information received from the resource reservation tool 502 and the reservation tracking tool 508, such as to indicate which resources are no longer available for given reservation slots and which resources have become available at given times.

In some implementations, the resource reservation software 500 may include other tools in addition to and/or instead of the tools 502 through 510. In some such implementations, the resource reservation software 500 may include a reservation analytics tool for monitoring, aggregating, and reporting analytical information associated with resource reservations. For example, the reservation analytics tool may track statistical information related to workers who have made reservations and utilized reserved resources, workers who have made reservations but did not utilize the reserved resources, workers who have not made reservations, how long resources were used (e.g., by tracking start to end times of reservations individually and at an aggregated level), which resources are most frequently reserved, which types of resources are most frequently reserved, days on and/or times at which resources are most or least frequently reserved, and the like. The statistical information may be compiled into reports presented to an office administrator or other personnel to better understand resource utilization.

In some such implementations, the output of the reservation analytics tool may be used to determine which workers are most reliably making reservations and utilizing reserved resources so as to grant priority access to those workers for future reservations. For example, priority access may include offering most frequently reserved resources to certain workers before allowing a general worker population to reserve them.

Although the tools 502 through 510 are shown as functionality of the resource reservation software 500 as a single piece of software, in some implementations, some or all of the tools 502 through 510 may exist outside of the resource reservation software 500 and/or the software platform may exclude the resource reservation software 500 while still including the some or all of tools 502 through 510 in some form elsewhere.

Figure 6:
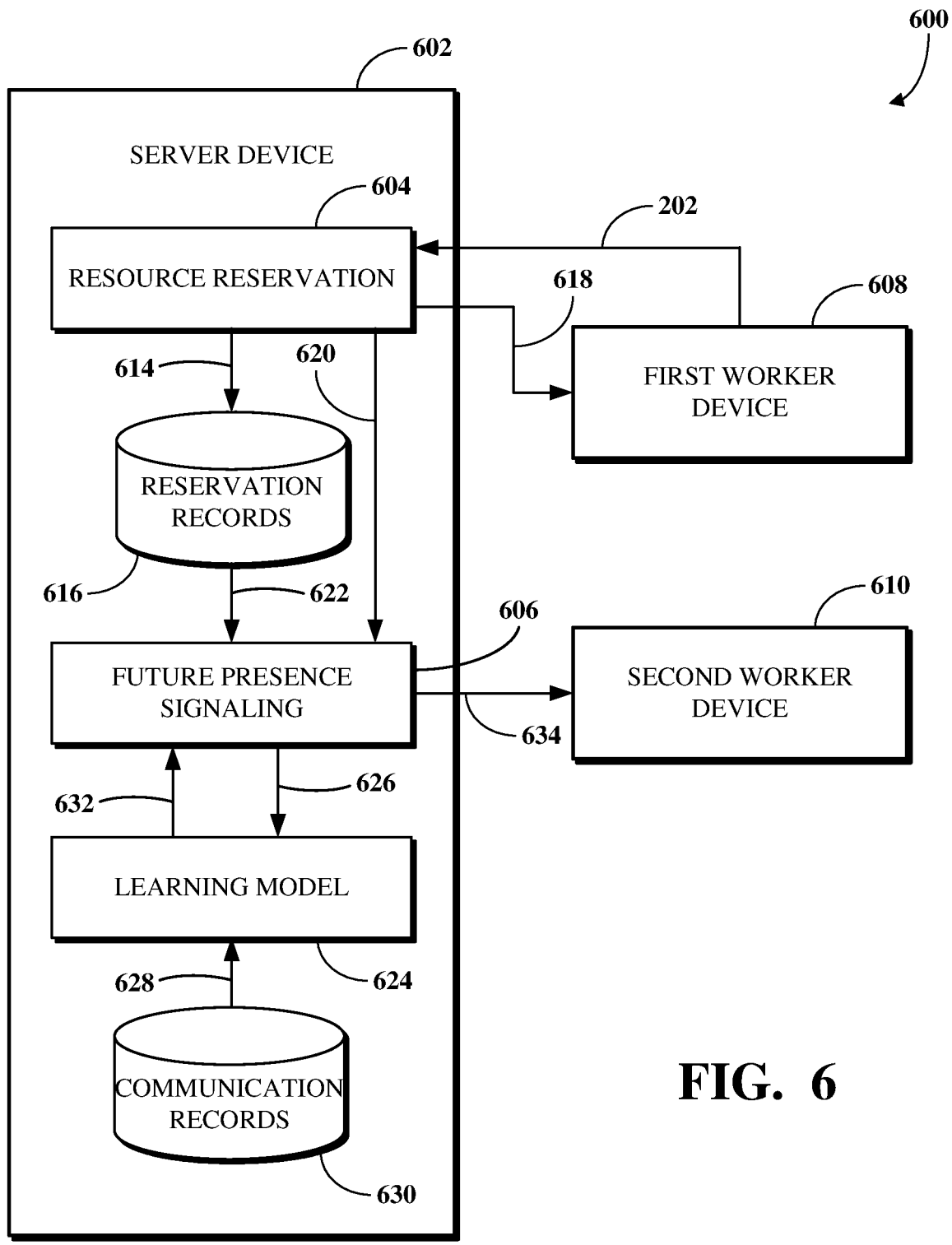
FIG. 6 is a block diagram of an example of a system for future presence signaling for a dynamic workspace.

FIG. 6 is a block diagram of an example of a system 600 for future presence signaling for a dynamic workspace. The system 600, which may, for example, be the system 400 shown in FIG. 4, includes a server device 602 such as the server device 402 shown in FIG. 4. The server device 602 runs software for future presence signaling, such as a resource reservation tool 604 and a future presence signaling tool 606, which may, for example, be the resource reservation tool 502 and the future presence signaling tool 504 shown in FIG. 5. The software for future presence signaling is used to indicate a reservation of a resource for a first worker associated with a first worker device 608 to a second worker associated with a second worker device 610.

The reservation of the resource for the first worker is initiated by a request 612 received from the first worker device 608. The request 612 is a request for a reservation of the resource. The resource reservation tool 604 processes the request 612 to make the reservation for the resource. Responsive to the reservation being made, the resource reservation tool 604 stores 614 a record of the resource reservation for the first worker in a reservation records data store 616, which may, for example, be the reservation records data store 412 shown in FIG. 4. The resource reservation tool 604 may also transmit a notification 618 of the reservation of the resource to the first worker device 608.

The resource reservation 604 also transmits a notification 620 of the reservation of the resource for the first worker to the future presence signaling tool 606. The future presence signaling tool 606, based on the notification 620, retrieves 622 the record of the reservation from the reservation records data store 616. The future presence signaling tool 606 obtains information associated with the first worker from the record retrieved from the reservation records data store 616. The future presence signaling tool 606 then processes that information associated with the first worker obtain output from a learning model 624. The learning model 624 may, for example, be trained based on conversational dynamics to determine an engagement between the first worker and the second worker. For example, the future presence signaling tool 606 may transmit data 626 configured to cause the learning model to produce output indicative of an engagement between the first worker and the second worker. In some implementations, however, the data 626 may be transmitted from another aspect, such as the resource reservation tool 604 in response to a reservation of the resource for the first worker. In some implementations, the future presence signaling tool 606 may include the learning model 624.

The learning model 624 analyzes communication records 628 obtained from a communication records data store 630 based on one or more of a subject matter of a dialogue represented by the communication records or a length of the dialogue to determine the engagement between the first worker and the second worker. The communication records data store 630 may, for example, be the communication records data store 418 shown in FIG. 4. The communications records 628 include content from one or more of a conference transcript, a call transcript, a chat message, a text message, or an email. The learning model 624 determines the engagement between the first worker and the second worker based on both the content of the communication records 628 and the context of that content. An engagement between the first worker and the second worker indicates a relationship between the first worker and the second worker. In particular, the relationship indicated by the engagement may be a professional, social, or other relationship.

The learning model 624 may analyze the communication records 628 which are between the first worker and the second worker and/or involve the first worker and the second worker in some way to determine the engagement. For example, the learning model 624 may analyze the communication records 628 to determine that the first worker and the second worker have engaged each other in conversation on multiple occasions or for some threshold amount of time. In another example, the learning model 624 may analyze the communication records 628 to determine that communications between the first worker and the second worker relate to casual content such as a joke, a recreational event, or the like. In yet another example, the learning model 624 may analyze the communication records 628 to determine that the first worker and/or the second worker have discussed collaborating on a project either with one another or with another person.

The output 632 of the learning model 624 is provided to the future presence signaling tool 606. The future presence signaling tool 606 determines to transmit a notification 634 indicative of the reservation of the first worker to the second worker, in particular, to the second worker device 610, based on the determination of the engagement between the first worker and the second worker. The transmission of the notification 634 to the second worker device 610 is to indicate the future presence of the first worker within a dynamic workspace that includes the reserved resource to the second worker. The second worker may then decide to reserve a resource of the dynamic workspace for the same time as the reservation of the resource for the first worker or for a time which overlaps with same.

In some implementations, the future presence signaling tool 606 or another software aspect can determine a suggested resource for the second worker based on the resource reserved for the first worker. For example, a location of the resource reserved for the first worker can be determined within a map of the dynamic workspace which includes the resource. One or more available resources bordering, adjacent to, neighboring, or otherwise within a threshold range of the reserved resource may then be determined as the suggested resource. In some such implementations, the available resources which may be considered for the determination of the suggested resource may be limited to those resources which are of a same resource type as the resource reserved for the first worker.

Figure 7:
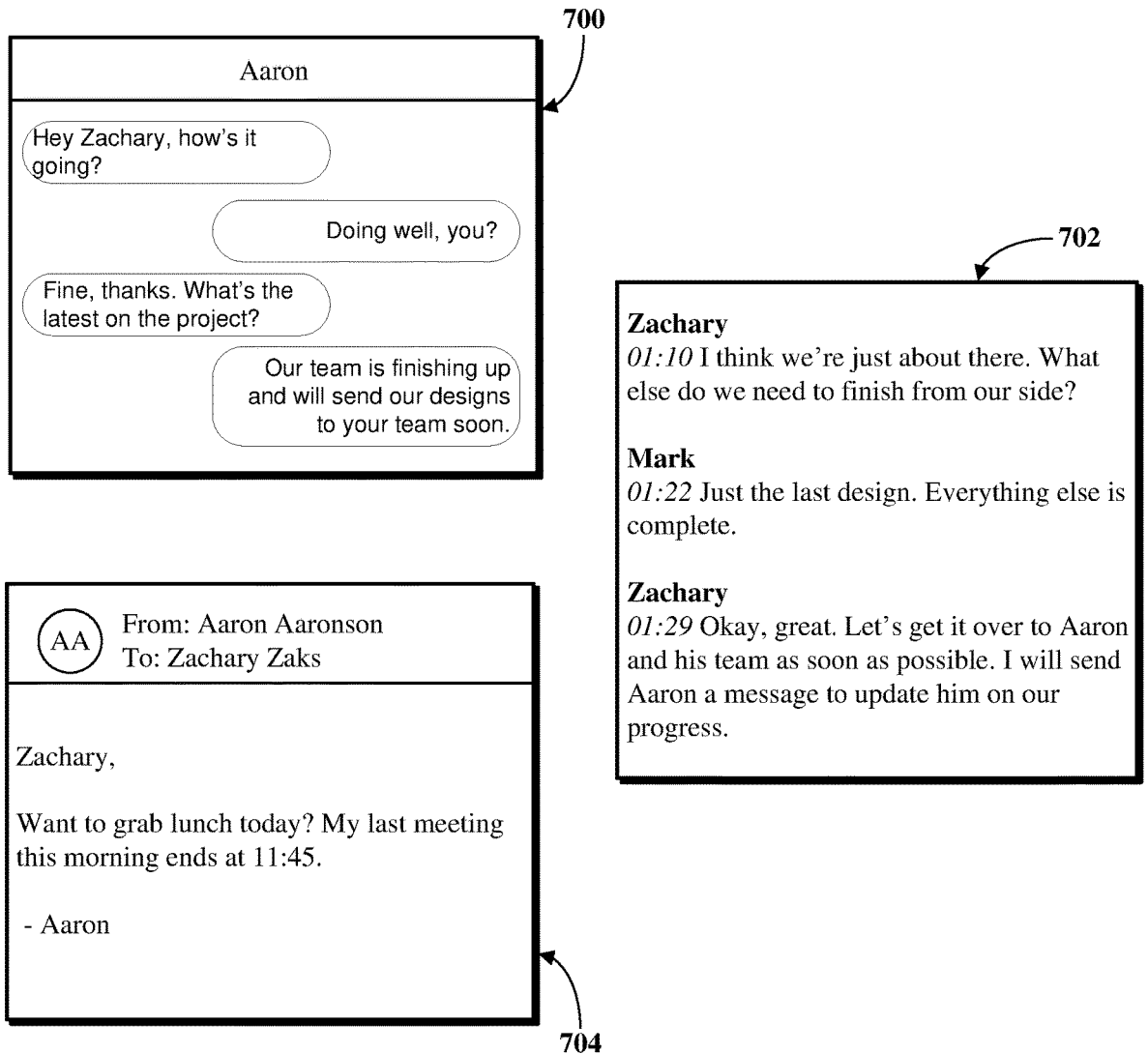
FIG. 7 is an illustration of an example of communications usable to determine a worker to whom to signal the future presence of another worker.

FIG. 7 is an illustration of an example of communications usable to determine a worker to whom to signal the future presence of another worker. The communications shown may, for example, be communications represented by communications records, such as the communication records 630 shown in FIG. 6. As shown, the communications include chat messages 700, a transcript 702, and an email 704. In particular, the chat messages 700, the transcript 702, and the email 704 include content usable to determine an engagement between two people named Aaron and Zachary. However, communications other than chat messages, transcripts, and email messages may be used to determine a worker to whom to signal the future presence of another worker.

The chat messages 700 are shown as being between Aaron and Zachary in which the chat conversation is seen from Zachary's side. The chat messages 700 begin with Aaron mentioning Zachary by name and later include Aaron asking Zachary a question about a project. A learning model, for example, the learning model 624 shown in FIG. 6, may process the chat messages 700 to determine an engagement between Aaron and Zachary for at least a few reasons. First, they are engaged in a direct chat with one another. Second, Aaron has sent a message with Zachary's name in it. Third, Aaron and Zachary appear to be collaborating on something given Aaron's mention of a project and Zachary's mention of his team finishing up and preparing to send something to Aaron's team.

The transcript 702, which may be a transcript of a call or a conference and may be generated in real-time or after a completion of the call or conference, shows a conversation between Zachary and a third person named Mark. From the context, it appears that Zachary and Mark are teammates working on something together. In particular, Zachary asks Mark about the work "we need to finish from our side." Zachary later responds to Mark's update by saying they will get their work to Aaron and his team thereafter and that Zachary will message Aaron about an update. A learning model, for example, the learning model 624, may process the transcript 702 to determine an engagement between Zachary and Aaron even though Aaron is not himself involved in the conversation corresponding to the transcript 702. For example, the learning model can process the transcript 702 to understand that Zachary and Aaron are on different teams but are working on the same project and also that Zachary knows Aaron well enough to message him about the project status.

The email 704 is shown as being from Aaron to Zachary and includes a message from Aaron asking Zachary if he wants to eat lunch with Aaron. A learning model, for example, the learning model 624, may process the email 704 to determine an engagement between Aaron and Zachary in that the email 704 is a direct message from one of them to the other and Aaron is asking Zachary to join him to eat a meal, which is generally a personal activity and not a professional one. The learning model may, for example, recognize that two people likely have an engagement between them where they participate in personal activities together.

Each of the chat messages 700, the transcript 702, and the email 704 individually may be useful by a learning model, for example, the learning model 624, to determine an engagement between Aaron and Zachary. However, the learning model may analyze the communications from across all three of the chat messages 700, the transcript 702, and the email 704 to more confidently determine an engagement between Aaron and Zachary. In particular, the learning model may leverage as many communication records as are available to arrive at its final output representative of an engagement between Aaron and Zachary.

Figure 8:
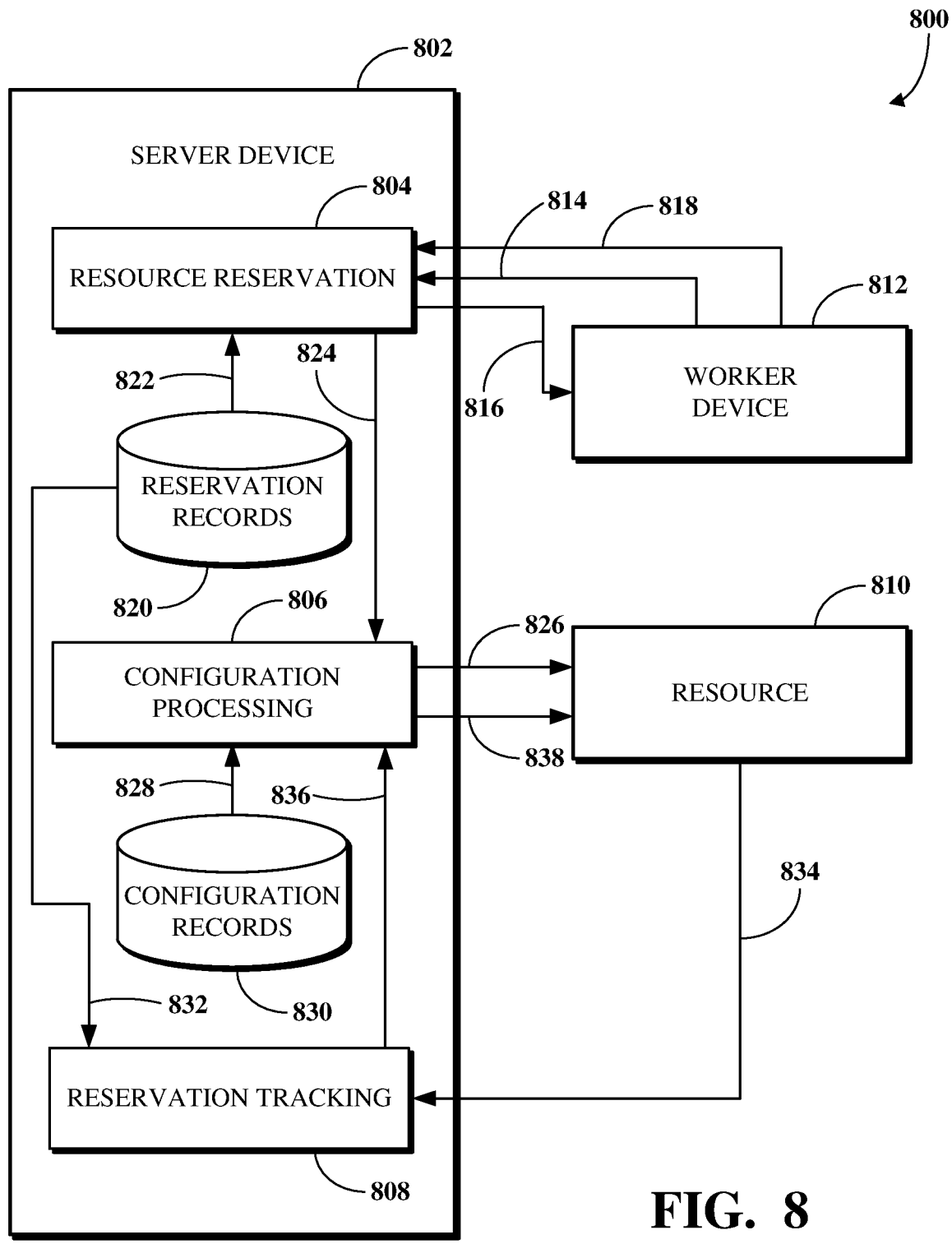
FIG. 8 is a block diagram of an example of a system for reservation-based resource configuration for a dynamic workspace.

FIG. 8 is a block diagram of an example of a system 800 for reservation-based resource configuration for a dynamic workspace. The system 800, which may, for example, be the system 600 shown in FIG. 4 or the system 600 shown in FIG. 6, to the extent different, includes a server device 802 such as the server device 402 shown in FIG. 4 or the server device 602 shown in FIG. 6, to the extent different. The server device 802 runs software for reservation-based resource configuration, such as a resource reservation tool 804, a configuration processing tool 806, and a reservation tracking tool 808, which may, for example, be the resource reservation tool 502, the configuration processing tool 506, and the reservation tracking tool 508 shown in FIG. 5. The software for reservation-based resource configuration is used to facilitate a reservation of a resource 810 for a worker associated with a worker device 812.

When the worker arrives to check in for the reservation of the resource 810, the worker transmits, from the worker device 812, a request 814 to check in for the reservation to the resource reservation tool 804. The resource reservation tool 804 then transmits a request 816 to verify an identity of the worker to the worker device 812. A response 818 to the request 816 including information usable to identify the worker is then transmitted to the resource reservation tool 804. The resource reservation tool 804 may, for example, verify the identity of the worker based on information stored within a reservation record data store 820, which may, for example, be the reservation records data store 412 shown in FIG. 4. For example, the resource reservation tool 804 may query 822 the reservation record data store 820 for a record associated with the resource 810 to identify information associated with the worker for whom the reservation is made and thereafter compare that information against the response 818 to verify the identity of the worker.

Once the identity of the worker is verified, the resource reservation tool 804 transmits information 824 to the configuration processing tool 806 to cause the configuration processing tool 806 to push configurations 826 to the resource 810. The pushing of the configurations 826 to the resource 810 configures the resource 810 for use by the worker during the reservation. The configuration processing tool 806 may, for example, obtain the configurations or data indicative thereof by a query 828 to a configuration records data store 830, which may, for example, be the configuration records data store 416 shown in FIG. 4.

In some implementations, the configurations 826 may be pushed to the resource 810 before the identity of the worker is verified. For example, the configurations 826 may be pushed to the resource 810 without worker intervention where the reservation for the resource 810 is a first or only reservation of a work day. In another example, a process for pushing the configurations 826 to the resource 810 may begin before the identity of the worker is verified where the configurations 826 are estimated to take a long time (e.g., 30 minutes or more) to process, such as where the configurations 826 require the installation of software.

Once the reservation period has begun, such as responsive to the resource reservation tool 804 verifying the identity of the worker and/or the configuration processing tool 806 pushing the configurations 826 to the resource 810, the reservation tracking tool 808 begins tracking the reservation to determine an end time for the reservation. For example, the reservation tracking tool 808 may receive information indicative of a scheduled end time for the reservation from a query 832 to the reservation records data store 820. In another example, the reservation tracking tool 808 may receive data 834 from one or more sensors coupled to or otherwise located nearby the resource 810 to determine that the resource 810 has gone unused for a threshold period of time during the reservation and before the scheduled end time thereof. Upon the first to occur of the scheduled end time or the determination that the resource 810 has gone unused for the threshold period of time, the reservation tracking tool 808 determines an end time of the reservation has been reached. Responsive thereto, the reservation tracking tool 808 transmits data 836 indicating that the end of time of the reservation has been reached to the configuration processing tool 806. Based on the data 836, the configuration processing tool 806 transmits instructions 838 to reset the resource 810 by removing the configurations 826 therefrom, such as to prepare the resource 810 for use by a next worker.

Figure 9:
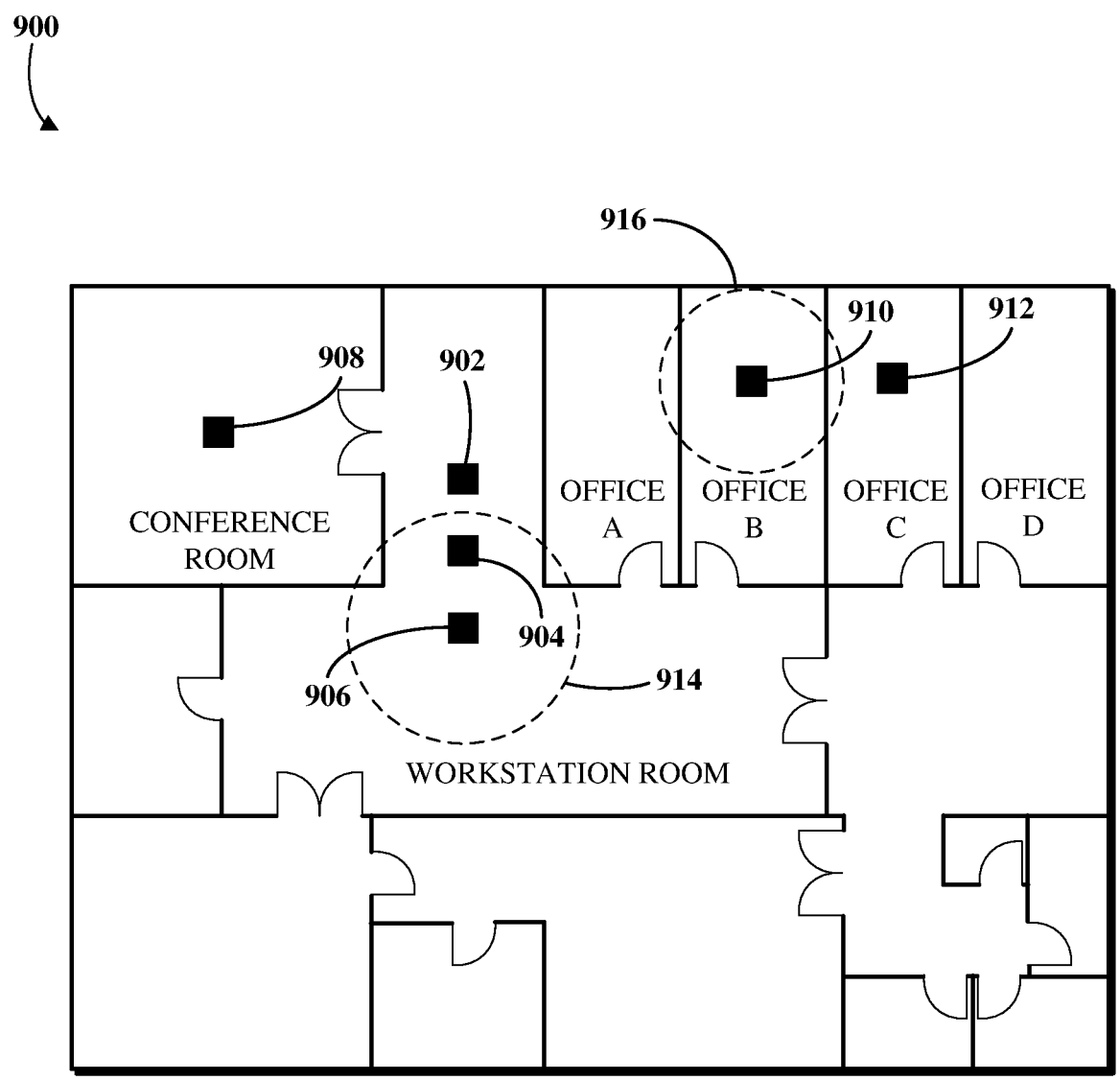
FIG. 9 is an illustration of an example of a map of a dynamic workspace including reserved and available resources.

FIG. 9 is an illustration of an example of a map 900 of a dynamic workspace including reserved and available resources. As shown, resources 902, 904, and 906 are in an open space labeled Workstation Room, a resource 908 is in a closed space labeled Conference Room, a resource 910 is in an office labeled Office B, and a resource 912 is in an office labeled Office C. For example, the resources 902, 904, and 906 may be or include desks, which may further include computing devices, desk phones, and/or like resources. In another example, the resource 908 may be or include a conference room, which may further include computing devices, desk phones, and/or like resources. In yet another example, the resources 910 and 912 may be offices, which may further include computing devices, desk phones, and/or like resources. The resources 906, 908, and 910 are reserved resources and the resources 902, 904, and 912 are available resources.

In an example, a first worker may have reserved the resource 906. Where a second worker seeks to work nearby the first worker during the same reservation time period or an overlapping such period (e.g., at a neighboring office or desk or at an office or desk which is less than a threshold range away from the office or desk reserved for the first worker), that second worker may choose to reserve the resource 904. Similarly, where a first worker has reserved the resource 910, a second worker who seeks to work nearby the first worker during the same reservation time period or an overlapping such period (e.g., at a neighboring office or desk or at an office or desk which is less than a threshold range away from the office or desk reserved for the first worker) may choose to reserve the resource 912. However, in some cases, the second worker in either example may not be allowed to reserve the respective available resources. For example, a blocking rule may limit the reservation of the resource 904 by the second worker in the first example above or the reservation of the resource 912 by the second worker in the second example above.

Referring to the first example above, a first blocking rule may prohibit certain workers, such as the second worker, from making a reservation for a resource within a threshold range of the resource 906. For example, the first worker who reserved the resource 906 may be a type of worker or on a team which is prohibited from collaborating or otherwise working within earshot of a different type of worker or another team, such as to which the second worker corresponds. In such a case, the blocking rule is a policy-based blocking rule. The threshold range used by the blocking rule may have a default or configurable value. In some implementations, the threshold range used by the blocking rule may be based on a geofence 914 associated with the resource 906. The geofence 914 may be imposed in response to the reservation of the resource 906 by the first worker. For example, because the geofence 914 includes the resource 904, the resource 904 is not available to the second worker. However, the resource 902 is outside of the geofence 914, so it may be available to the second worker.

Referring to the second example above, a second blocking rule may prohibit certain workers, such as the second worker, from making a reservation for a resource within a threshold range of the resource 910. For example, the first worker who reserved the resource 910 may have a close social or personal relationship with the second worker which has resulted in one or more records indicating disruptive tendencies when the first worker and the second worker interact. The disruptive tendencies may refer to communications between the first worker and the second worker disrupting their own work or the work of others, or it may refer to those communications resulting in the first worker and/or the second worker otherwise being inefficient at one or more tasks. In such a case, the blocking rule is a productivity-based blocking rule. The threshold range used by the blocking rule may have a default or configurable value. In some implementations, the threshold range used by the blocking rule may be based on a geofence 916 associated with the resource 910. The geofence 916 may be imposed in response to the reservation of the resource 910 by the first worker. For example, because the geofence 916 overlaps with the resource 912, the resource 912 is not available to the second worker. However, the resources 902 and 904 are outside of the geofence 916, so they may be available to the second worker.

In some implementations, geofences imposed based on resource reservations within a dynamic workspace may be used to enforce physical separations of workers within the dynamic workspace. For example, where a blocking rule prohibits a first worker from reserving a first resource within a threshold range of a second resource reserved for a second worker, a notification indicating a violation of the blocking rule may be transmitted to a device associated with the first worker responsive to a detection of the device within a geofence associated with the second resource. In some such implementations, a device may be detected within a geofence associated with a resource using geolocation. A geofence refers to a virtual perimeter for an area within a dynamic workspace which is centered at a resource. The geofence for a resource may be configurably sized based on the type of resource (e.g., in which the geofence for a desk is smaller than the geofence for an office, which is smaller than the geofence for a conference room). The geofence may take the form of various shapes, such as a circle radially extending from the subject resource. In some cases, the geofence may refer to a virtual boundary delineating regions of a building or campus, such as a suite, floor, or the like. The geofence may, for example, be configured by an administrator of the dynamic workspace.

Figure 10:
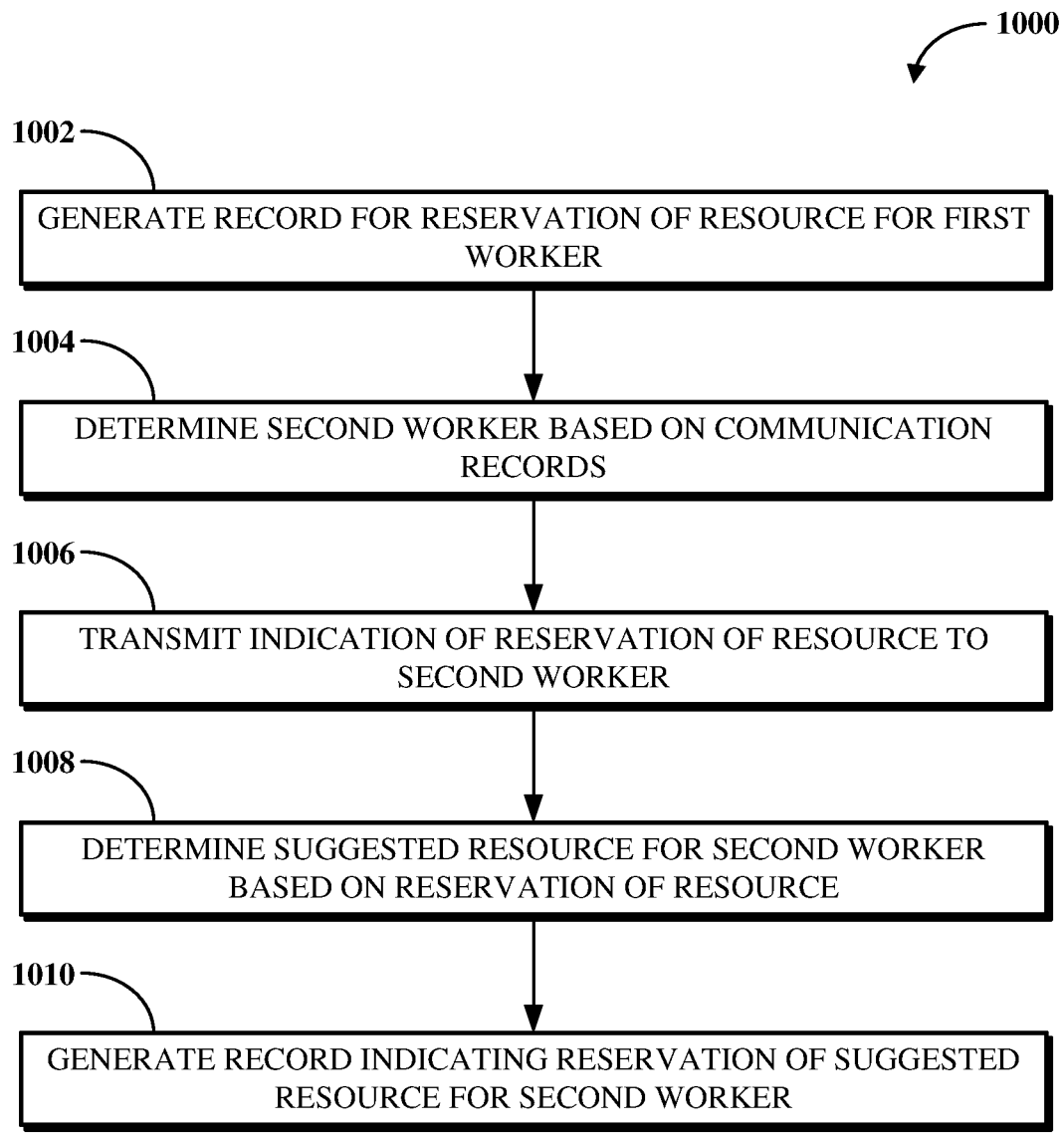
FIG. 10 is a flowchart of an example of a technique for future presence signaling for a dynamic workspace.
Figure 11:
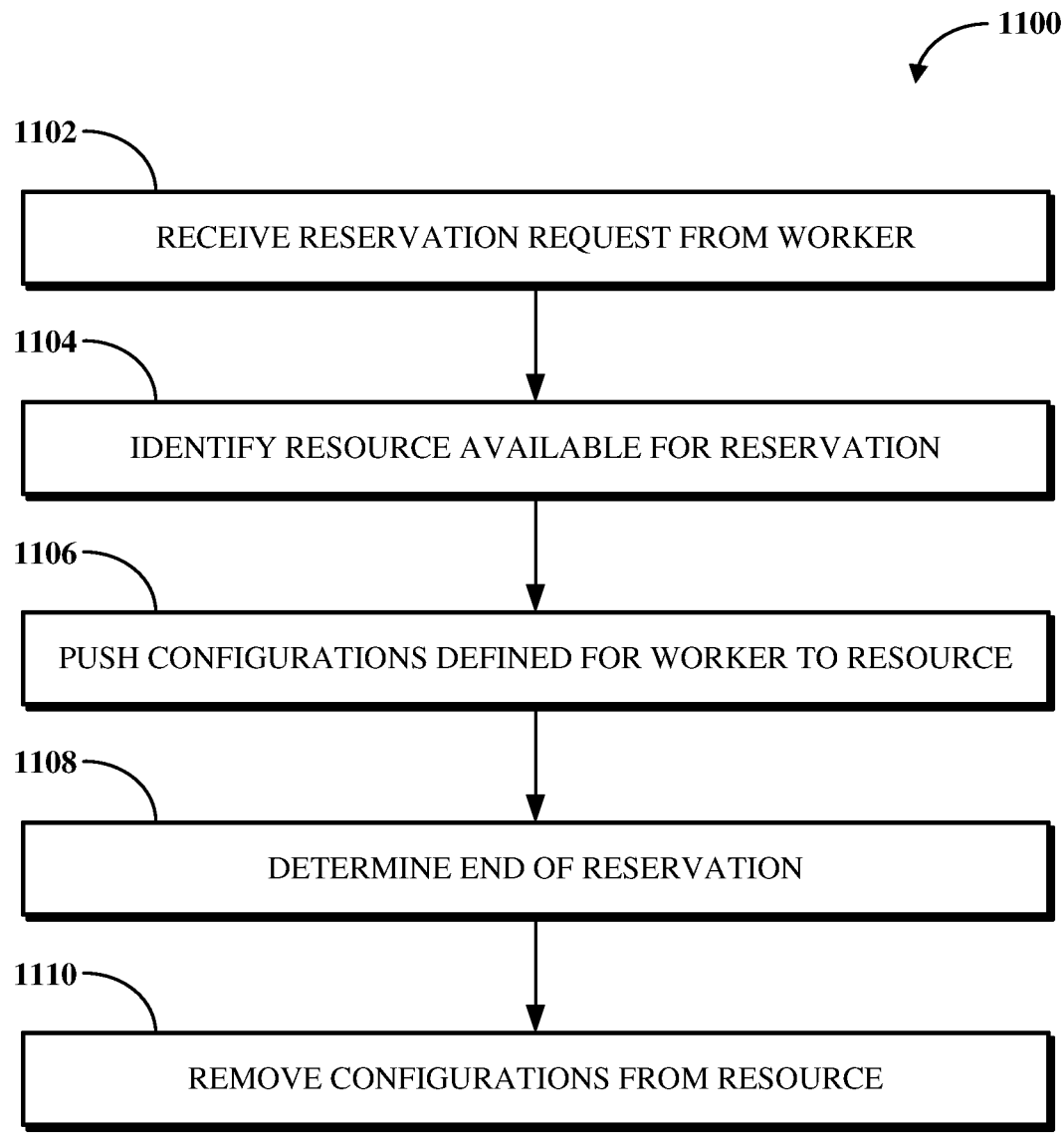
FIG. 11 is a flowchart of an example of a technique for reservation-based resource configuration for a dynamic workspace.

To further describe some implementations in greater detail, reference is next made to examples of techniques which may be performed by or using a system for reservation-based resource configuration for dynamic workspaces. FIG. 10 is a flowchart of an example of a technique 1000 for future presence signaling for a dynamic workspace. FIG. 11 is a flowchart of an example of a technique 1100 for reservation-based resource configuration for a dynamic workspace.

The technique 1000 and/or the technique 1100 can be executed using computing devices, such as the systems, hardware, and software described with respect to FIGS. 1-9. The technique 1000 and/or the technique 1100 can be performed, for example, by executing a machine-readable program or other computer-executable instructions, such as routines, instructions, programs, or other code. The steps, or operations, of the technique 1000 and/or the technique 1100 or another technique, method, process, or algorithm described in connection with the implementations disclosed herein can be implemented directly in hardware, firmware, software executed by hardware, circuitry, or a combination thereof.

For simplicity of explanation, the technique 1000 and the technique 1100 are each depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Referring first to FIG. 10, the technique 1000 for future presence signaling for a dynamic workspace is shown. At 1002, a record is generated for a reservation of a resource for a first worker. The record is generated in response to a reservation request for the resource which is processed to complete the reservation for the first worker. The resource is located in a dynamic workspace, such as a physical office space which includes multiple resources for reservation by workers. The request for the reservation of the resource for the first worker may be received from a client application of a device of the first worker, at a kiosk within the dynamic workspace, or another personal or shared device.

At 1004, a second worker is determined based on communication records associated with the first worker and the second worker. Determining the second worker based on the communication records associated with the first worker and the second worker includes analyzing the communication records using a learning model trained based on conversational dynamics to determine an engagement between the first worker and the second worker. The learning model analyzes the communication records based on one or more of a subject matter of a dialogue represented by the communication records or a length of the dialogue. The communication records include content from one or more of a conference transcript, a call transcript, a chat message, a text message, or an email.

At 1006, an indication of the reservation of the resource for the first worker is transmitted to the second worker. Transmitting the indication of the reservation of the resource for the first worker to the second worker includes transmitting a notification indicating a future presence of the first worker to a device associated with the second worker. In particular, the indication, which may be or be included in a message, notification, or other information, is transmitted to the device associated with the second worker. For example, the indication may be transmitted as a push notification within or otherwise for a client application running at the device associated with the second worker. In another example, the indication may be transmitted as a short message service (SMS) message, such as a text message, to a telephone number registered for the second worker. In yet another example, the indication may be an email, chat message, instant message, or other message or notification transmittable to the device associated with the second worker.

At 1008, a suggested resource for the second worker is determined based on the reservation of the resource for the first worker. The suggested resource is a resource bordering, adjacent to, neighboring, or otherwise within a threshold range of the resource reserved for the first worker. The suggested resource is determined responsive to a resource reservation request from the second worker. For example, the resource reserved for the first worker may be a first desk or office and the suggested resource determined for the second worker may be a second desk or office located within a threshold range of the first desk or office.

At 1010, a record is generated for the reservation of the suggested resource for the second worker. The record may be stored in a same data store as the record of the reservation of the resource for the first worker.

In some implementations, the technique 1000 may omit determining the suggested resource and generating the record for the reservation of the suggested resource. For example, a resource reservation request may be received from the device associated with the second worker, such as responsive to the notification transmitted to the second worker to indicate the reservation of the resource for the first worker or otherwise. For example, the second worker may access a map of the dynamic workspace showing available resources to select the requested resource. In some such implementations, a record may then be generated for the reservation of the requested resource for the second worker after a reservation process therefor has been completed.

Referring next to FIG. 11, the technique 1100 for reservation-based resource configuration for a dynamic workspace is shown. At 1102, a reservation request is received from a worker. The reservation request is a request to reserve a resource located within a dynamic workspace, such as a physical office space, which includes multiple resources available for reservation by workers. The request may be received from a client application of a device of the worker, at a kiosk within the dynamic workspace, or another personal or shared device. The request may be for a specific resource or to pursue a selection of one of multiple available resources.

At 1104, a resource available for reservation is identified. Where the reservation request identifies a specific resource, the resource is identified by processing or otherwise parsing the request. Otherwise, identifying the resource available for the reservation request may include presenting a map of the dynamic workspace to a device used by the worker to allow the worker to identify the resource. The resource may then be identified responsive to a selection by the worker of one of the available resources in the map. In some implementations, the resource may be suggested based on one or more specified needs of the worker. In some implementations, identifying the resource available for the reservation requested by the worker can include determining that a use of the resource by the worker satisfies a blocking rule limiting near proximities of certain workers. For example, a blocking rule may prohibit the worker from reserving a resource nearby another resource reserved by another worker.

At 1106, configurations defined for the worker are pushed to the resource responsive to the worker checking in for the reservation. The configurations may be obtained from one or more of a configuration record data store, a client application running on a device of the worker, or another source. Pushing the configurations includes causing a configurable change to one or more aspects of the resource and/or one or more resources included in the resource. For example, where the resource is a desk or office, pushing the configurations can include pushing configurations to a desk phone, computing device, and digital signage of the desk or office.

At 1108, an end of the reservation is determined. The end of the reservation may be determined either based on a default end of a time period for the reservation or based on the resource going unused for a threshold period of time. For example, the default end of the time period may be the time at which the reservation of the resource is scheduled to end per the reservation itself. This time period may be adjustable when the worker makes the reservation or non-adjustable. In another example, one or more sensors within or nearby the resource may be used to detect when a threshold amount of time has elapsed without the resource being used. In such a case, and once that threshold amount of time has passed, the end of the reservation may be accelerated. In some implementations, responsive to the resource going unused for the threshold period of time, an availability of the resource may be signaled to a next worker on a waitlist for the resource.

At 1110, the configurations pushed for the worker are removed from the resource responsive to the end of the reservation. Removing the configurations from the resource responsive to the end of the reservation includes resetting the configurable changes made to the resource and/or other resources within the resource to prepare same for use by a next worker. The configurations may be removed by an automated process which returns the resource to a pre-reservation state.

In some implementations, the technique 1100 includes checking the worker in for the reservation responsive to verifying an identity of the worker based on information obtained from a client application running on a device of the worker. For example, when the worker checks in for the reservation, the worker may use his or her device to scan a code to link the reservation to a client application running on the device. In response thereto, the device of the worker may be prompted, with or without notice to the worker, for information usable to identify the worker. The information is then transmitted for identity verification before the worker is checked in for the reservation, such as before configurations are pushed to the resource.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
 receiving a request to check in for a workspace reservation;
 identifying a workspace for the workspace reservation;
 pushing a device configuration to one or more devices at the workspace corresponding to the workspace reservation;
 receiving data generated from one or more sensors corresponding to the workspace indicating the workspace has been underutilized for a threshold period of time;

determining to end the workspace reservation based on the data; and transmitting instructions to remove the device configuration from the one or more devices at the workspace.

2. The method of claim 1, the method further comprising:

checking a worker in for the workspace reservation responsive to verifying an identity of the worker based on information obtained from a client application running on a client device of the worker.

3. The method of claim 1, wherein the device configuration comprises one or more of a telephone extension, software customizations, and identity information.

4. The method of claim 1, the method further comprising:

responsive to the one or more devices going unused for the threshold period of time, signaling an availability of the workspace to a next worker on a waitlist for the workspace; and responsive to the next worker checking in for the next reservation, pushing a device configuration specific to the next worker to the one or more devices.

5. The method of claim 1, the method further comprising:

causing digital signage associated with the workspace to identify a worker.

6. The method of claim 1, wherein identifying the workspace comprises:

determining that a use of the workspace by a worker satisfies a blocking rule limiting the worker from being within a threshold range of one or more other workers.

7. The method of claim 6, wherein the blocking rule prohibits the worker from reserving a first workspace within a threshold range of a second workspace reserved for a second worker, the method further comprising:

transmitting a notification indicating a violation of the blocking rule to a client device of the worker based on a detection of the client device within a geofence associated with the second workspace.

8. The method of claim 1, wherein identifying the workspace comprises:

suggesting the workspace for a worker based on a reservation of a nearby workspace for a second worker.

9. The method of claim 8, the method further comprising:

responsive to the reservation of the nearby workspace for the second worker, analyzing communication records associated with the worker and the second worker to determine to suggest the workspace for the worker.

10. The method of claim 9, wherein the communication records are analyzed using a learning model based on one or both of a subject matter of a dialogue of the communication records or a length of the dialogue.

11. An apparatus, comprising:

a memory; and a processor configured to execute instructions stored in the memory to:

receive a request to check in for a workspace reservation requested;

identify a workspace for the workspace reservation;

push a device configuration to one or more devise at the workspace corresponding to the workspace reservation;

receive data generated from one or more sensors corresponding to the workspace indicating the workspace has been underutilized for a threshold period of time;

determine to end the workspace reservation based on the data; and transmit instructions to remove the device configuration from the one or more devices at the workspace.

12. The apparatus of claim 11, wherein the processor is configured to execute the instructions to:

verify an identity of a worker for the workspace reservation based on information obtained from a client application running on a client device.

13. The apparatus of claim 11, wherein the end of the workspace reservation is determined based on a defined end time for the workspace reservation.

14. The apparatus of claim 11, wherein the processor is configured to execute the instructions to:

signal an availability of the workspace to a next worker responsive to the end of the workspace reservation; and push a device configuration specific to the next worker to the one or more devices at the workspace responsive to the next worker checking in for the next reservation of the workspace.

15. The apparatus of claim 11, wherein the processor is configured to execute the instructions to:

cause a digital signage display associated with the workspace to indicate the workspace reservation responsive to a worker checking in for the workspace reservation.

16. The apparatus of claim 11, wherein the processor is configured to execute the instructions to:

generate a record of the workspace reservation responsive to a reservation request for the workspace by a worker; and signal an indication of the workspace reservation of the workspace to a second worker determined based on communication records associated with the worker and the second worker.

17. A non-transitory computer readable medium storing instructions operable to cause one or more processors to perform operations comprising:

receive a request to check in for a workspace reservation;

identifying a workspace for the workspace reservation;

pushing a device configuration to one or more devices at the workspace corresponding to the workspace reservation;

receiving data generated from one or more sensors corresponding to the workspace indicating the workspace has been underutilized for a threshold period of time;

determining to end the workspace reservation based on the data; and transmitting instructions to remove the device configuration from the one or more devices at the workspace.

18. The non-transitory computer readable medium of claim 17, wherein the workspace is identified as being available for the workspace reservation subject to a blocking rule limiting a worker from being within a threshold range of one or more other workers.

19. The non-transitory computer readable medium of claim 17, wherein a time period for the workspace reservation is based on a resource type of the workspace.

20. The non-transitory computer readable medium of claim 17, wherein the device configuration further corresponds to one or more of a digital signage name display or background imagery for a client application.

* * * * *